(12) United States Patent
Mason

(10) Patent No.: X7959
(45) Date of Patent: Jan. 17, 1834

(54) SPINNING COTTON & SILK

(76) Inventor: Samuel P. Mason

United States Patent Patent No.: X7959

Samuel P. Mason: Killingly Ct.
Letters Patent

The Schedule referred to in these Letters Patent and making part of
the same containing a description in the words of the said Samuel P. Mason
himself of his improvement in the Machine for spinning Cotton and
silk To all to whom these presents shall come: Be it known that
I Samuel P. Mason of Killingly in the County of Windham and State
of Connecticut have invented a new and useful improvement in the
art of spinning Cotton and silk consisting of a Flyer of a cylin
drical form and a step to be applied to any spinning frame
used for spinning Cotton or silk, and so constructed as to meet with
less resistance from the atmosphere than any flyer now in use and
consequently to be capable of greater speed and to require less power
And that the following specification including and referring to the
drawings and diagrams hereunto annexed contains a full and exact
description of the construction and operation ~~and operation~~ of the said
Machine as invented and improved by me —

A cylinder marked A (see diagram) made of brass copper iron
or any other suitable material 2½ inches to 3½ in length or of such
length as to suit any length of bobbin that the manufacturer may
deem proper to use and the diameter of the cylinder made to suit
the size of the bobbin say from one to three inches. In one end
of this cylinder is a bottom or head to which a steel or iron hollow
spindle (B) is either screwed or brazed from 2½ to four inches in
length which runs in a step (C) and has a bearing (D) near the
top and close to the bottom of the cylinder, and has on it a whirl (E)
in which a band runs to give motion to the Flyer. Through the above
described hollow spindle passes a cast steel spindle (F) up
through the centre of the cylinder on which is fixed a wood or brass

United States Patent

Patent No.: X7959 button (I.) which supports the bobbin (K.) the cast steel spindle last
mentioned has a traverse motion[illegible] lifted up and down which regulates
the filling or laying of the yarn on the bobbin. At the top of the cylinder
which stands perpendicular either small hooks are attached or small
[illegible] [illegible] with the same for the purpose of giving twist to and guiding
the thread on the bobbin. The above mentioned spindle marked F.
not differing essentially from many spindles now in use is not claim
ed as a part of the invention.
In witness whereof I have hereunto subscribed my name this
16th day of December A.D. 1833

Evan Parish } Witnesses
Thomas Backus }

Samuel P. Mason

[illegible]

456 [illegible]